United States Patent
Rama et al.

(10) Patent No.: US 11,362,345 B2
(45) Date of Patent: Jun. 14, 2022

(54) COOLING MODULE FOR A FUEL CELL SYSTEM AND METHOD OF DETECTING FLOWABLE COOLANT IN A FUEL CELL SYSTEM

(71) Applicant: Intelligent Energy Limited, Loughborough (GB)

(72) Inventors: Pratap Rama, Loughborough (GB); Nathaniel Thomas Palmer, Loughborough (GB); Sophie Charlotte Harris, Loughborough (GB); David James Grimwade, Loughborough (GB); Prajwal Nirwan, Loughborough (GB)

(73) Assignee: Intelligent Energy Limited, Loughborough (GB)

( * ) Notice: Subject to any disclaimer, the term of this patent is extended or adjusted under 35 U.S.C. 154(b) by 110 days.

(21) Appl. No.: 16/636,473

(22) PCT Filed: Aug. 2, 2018

(86) PCT No.: PCT/GB2018/052211
§ 371 (c)(1),
(2) Date: Feb. 4, 2020

(87) PCT Pub. No.: WO2019/025805
PCT Pub. Date: Feb. 7, 2019

(65) Prior Publication Data
US 2020/0251754 A1 Aug. 6, 2020

(30) Foreign Application Priority Data
Aug. 4, 2017 (GB) ...................................... 1712572

(51) Int. Cl.
*H01M 8/04029* (2016.01)
*H01M 8/04007* (2016.01)
(Continued)

(52) U.S. Cl.
CPC ... *H01M 8/04029* (2013.01); *H01M 8/04074* (2013.01); *H01M 8/04253* (2013.01); *H01M 8/04358* (2013.01); *H01M 8/04417* (2013.01)

(58) Field of Classification Search
CPC ......... H01M 8/04029; H01M 8/04074; H01M 8/04253; H01M 8/04358; H01M 8/04417
See application file for complete search history.

(56) References Cited

U.S. PATENT DOCUMENTS

| 2005/0026013 | A1 | 2/2005 | Sakakida et al. |
| 2009/0208796 | A1* | 8/2009 | Matsuo ............. H01M 8/04067 429/429 |

(Continued)

FOREIGN PATENT DOCUMENTS

| GB | 2526377 A | 11/2015 |
| JP | 2004-335338 A | 11/2004 |

(Continued)

OTHER PUBLICATIONS

English Translation of JP-2004335338A (Year: 2004).*
(Continued)

*Primary Examiner* — Stewart A Fraser
(74) *Attorney, Agent, or Firm* — BakerHostetler LLP; Mark Krietzman

(57) ABSTRACT

Disclosed is a cooling module for use in a fuel cell system, the module includes a tank configured to receive a coolant therein, a coolant, a pump in fluid communication with the coolant in the tank and the fuel cell system, the pump being configured to transport the coolant to the fuel cell system, a heating element within the coolant in the tank, the heating element configured to heat the coolant, and at least one sensor in signal communication with a controller and in fluid communication with the tank. The sensor is configured to detect a change corresponding to the presence or absence of sufficient liquid coolant to initiate said pump, and the (Continued)

controller processes sensor data and is configured to actuate the pump.

25 Claims, 4 Drawing Sheets

(51) Int. Cl.
*H01M 8/04223* (2016.01)
*H01M 8/0432* (2016.01)
*H01M 8/0438* (2016.01)

(56) References Cited

U.S. PATENT DOCUMENTS

| | | | |
|---|---|---|---|
| 2012/0255366 A1* | 10/2012 | Cai | H01M 8/04417 73/861 |
| 2015/0236361 A1* | 8/2015 | Kells | H01M 8/04029 429/434 |
| 2017/0214065 A1 | 7/2017 | Ninan et al. | |

FOREIGN PATENT DOCUMENTS

| | | |
|---|---|---|
| JP | 2004335338 | 11/2004 |
| JP | 2005-108758 A | 4/2005 |
| JP | 2005108758 | 4/2005 |
| JP | 2005-149914 A | 6/2005 |
| JP | 2005149914 | 6/2005 |
| WO | WO 2016/083814 A1 | 6/2016 |

OTHER PUBLICATIONS

International Patent Application No. PCT/GB2018/052211; Int'l Search Report and the Written Opinion; dated Oct. 31, 2018; 15 pages.
International Patent Application No. PCT/GB2018/052211; Int'l Preliminary Report on Patentability; dated Feb. 13, 2020; 9 pages.
International Search Report dated Oct. 31, 2018 in PCT Application No. PCT/GB2018/052211.
International Written Opinion dated Oct. 31, 2018 in PCT Application No. PCT/GB2018/052211.

* cited by examiner

COOLING MODULE FOR A FUEL CELL SYSTEM AND METHOD OF DETECTING FLOWABLE COOLANT IN A FUEL CELL SYSTEM

CROSS-REFERENCE TO RELATED APPLICATIONS

This application is a 371 National Stage Application of International Patent Application No. PCT/GB2018/052211 filed Aug. 2, 2018, which claims priority to GB Patent Application No. 1712572.5 filed on Aug. 4, 2017, the entire contents of which are incorporated by reference herein.

TECHNICAL FIELD

This disclosure relates generally to fuel cell systems having fluid coolant storage tanks. Particularly, this disclosure is directed to methods and devices of controlling freezable coolant.

BACKGROUND

Conventional electrochemical fuel cells convert fuel and oxidant into electrical energy and a reaction product. A common type of electrochemical fuel cell comprises a membrane electrode assembly (MEA), which includes a polymeric ion (proton) transfer membrane between an anode and a cathode and gas diffusion structures. The fuel, for example hydrogen, and the oxidant, for example oxygen from air, are passed over respective sides of the MEA to generate electrical energy and water as the reaction product. A stack may be formed comprising a number of such fuel cells arranged with separate anode and cathode fluid flow paths. Such a stack is typically in the form of a block comprising numerous individual fuel cell plates held together by end plates at either end of the stack.

SUMMARY

Methods and devices for controlling a fuel cell system are disclosed. According to one aspect, a cooling module for use in a fuel cell system includes a tank configured to receive a coolant therein, a coolant, a pump in fluid communication with the coolant in the tank and the fuel cell system, the pump being configured to transport the coolant to the fuel cell system, a heating element within the coolant in the tank, the heating element configured to heat the coolant, and at least one sensor in signal communication with a controller and in fluid communication with the tank. The sensor is configured to detect a change corresponding to the presence or absence of sufficient liquid coolant to initiate said pump, and the controller processes sensor data and is configured to actuate the pump.

In some implementations, the coolant may be at least frozen or partially frozen. The coolant may be water. The sensor may be located remote from the liquid or frozen coolant and positioned to measure a quality of the vapor phase of the coolant. The sensor may measure change of at least one of vapor pressure and vapor temperature. The controller may be configured to heat the coolant until a predetermined set point is reached of at least one of the vapor pressure and the vapor temperature as indicated by the sensor. In some aspects, the sensor may be one or more submersible strain gauges placed in the coolant, an electromechanical switch, for example a bimetallic switch, a thermocouple, or a float having a density less than the density of the coolant. In some aspects, the pump may be a peristaltic pump. In some implementations, the controller may be configured to heat the heating element(s) which are in thermal communication with the coolant, and heat the coolant until a predetermined set point is reached of the vapor temperature as indicated by the thermocouple. The strain gauge may be disposed in the coolant. In some aspects, the heating element may include a resistance heater. In another aspect, the heating element may include exhaust from the fuel cell system, the exhaust being of sufficient temperature to melt at least a portion of the coolant when the coolant is in its frozen state.

According to another aspect of the disclosure, a cooling module for use in a fuel cell system includes a tank configured to receive a coolant therein; water coolant; a pump in fluid communication with the water coolant in the tank and the fuel cell system, the pump being configured to transport the coolant to the fuel cell system; a heating element within the water coolant in the tank, the heating element configured to be in thermal communication with the coolant and thereby heat the water coolant; and at least one sensor in signal communication with a controller and in physical contact with a portion of the tank configured to detect a change in the stress the water coolant exerts on the tank or any portion thereof. The phase of the water coolant corresponds to the presence or absence of sufficient liquid coolant to initiate said pump, and the controller processes sensor data and is configured to actuate the pump. In some aspects, the water coolant may be frozen or partially frozen. The sensor may be located on an external portion of the tank not immersed in the water coolant.

According to another aspect of the disclosure, a method of detecting flowable coolant for use in a fuel cell system includes the steps of introducing a coolant into a tank; heating the coolant with a heating element in thermal communication with the coolant; measuring a change associated with the coolant via a sensor in fluid communication with the tank; processing the measurement with a controller in signal communication with the sensor; determining from the measurement if sufficient liquid coolant is available for transport to the fuel cell; and actuating a pump in signal communication with the controller to move the liquid coolant to the fuel cell system via the pump, the pump being in fluid communication with the tank and the fuel cell system.

In some aspects, the coolant may be water. The heating step may include generating vapor within the tank, and the sensor may be configured to measure at least one of a vapor pressure and a vapor temperature. The sensor may be a thermocouple, a pressure sensor, a bimetallic switch, a strain gauge, or a float. In some aspects, the sensor is a submersible strain gauge placed in the coolant.

BRIEF DESCRIPTION OF THE DRAWINGS

The present application is further understood when read in conjunction with the appended drawings. For the purpose of illustrating the subject matter, there are shown in the drawings exemplary implementations of the subject matter; however, the presently disclosed subject matter is not limited to the specific methods, devices, and systems disclosed. Furthermore, the drawings are not necessarily drawn to scale. In the drawings.

DETAILED DESCRIPTION OF ILLUSTRATIVE IMPLEMENTATIONS

Figure 1:
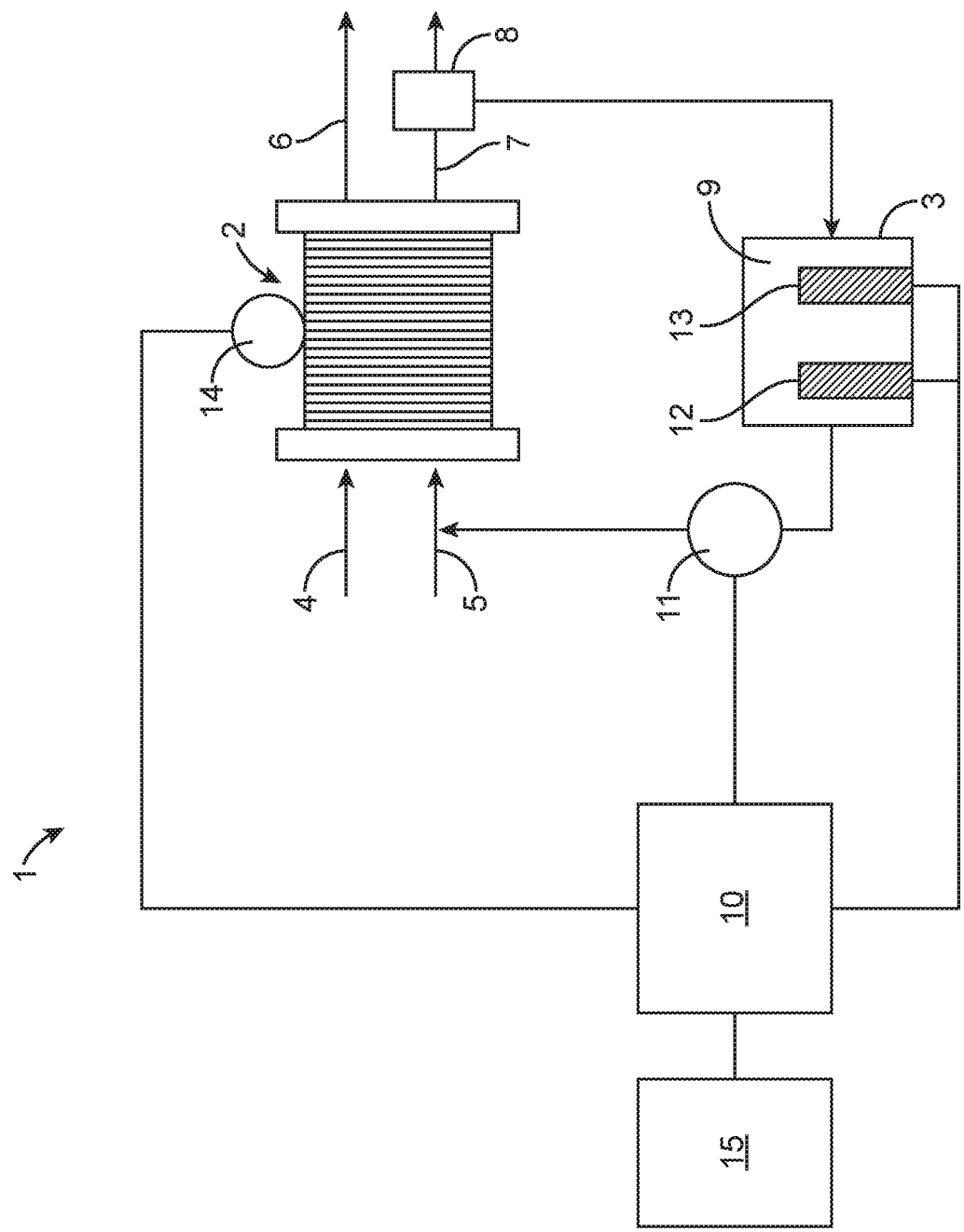
FIG. 1 illustrates a schematic diagram of a fuel cell system according to an aspect of the disclosure.

Aspects of the disclosure will now be described in detail with reference to the drawings, wherein like reference numbers refer to like elements throughout, unless specified otherwise. Certain terminology is used in the following description for convenience only and is not limiting. The term "plurality," as used herein, means more than one. The singular forms "a," "an," and "the" include the plural reference, and reference to a particular numerical value includes at least that particular value, unless the context clearly indicates otherwise. Thus, for example, a reference to "a material" is a reference to at least one of such materials and equivalents thereof known to those skilled in the art, and so forth.

When values are expressed as approximations by use of the antecedent "about," it will be understood that the particular value forms another implementation. In general, use of the term "about" indicates approximations that can vary depending on the desired properties sought to be obtained by the disclosed subject matter and is to be interpreted in the specific context in which it is used, based on its function, and the person skilled in the art will be able to interpret it as such. In some cases, the number of significant figures used for a particular value may be one non-limiting method of determining the extent of the word "about." In other cases, the gradations used in a series of values may be used to determine the intended range available to the term "about" for each value. Where present, all ranges are inclusive and combinable. That is, reference to values stated in ranges includes each and every value within that range.

The disclosed fuel cell systems may be used in various environments. As such, it may be advantageous for the polymeric ion transfer membrane to remain hydrated for efficient operation. Due to produced heat, it may also be beneficial to control the temperature of the fuel cell stack. Thus, coolant may be supplied to the stack for cooling and/or hydration. Accordingly, a fuel cell system may include a coolant tank for hydration and/or cooling of the fuel cell stack. In some aspects, the coolant may include water, and the coolant tank may be a water tank. Although exemplary implementations described herein may teach using water as the coolant, it is understood that the disclosure is not limited to only water. While "water" and "coolant" may be used interchangeably throughout this disclosure, other suitable fluids and mixtures may comprise the coolant.

In some exemplary implementations, the fuel cell system may be stored or operated in environments with ambient temperatures below the freezing point of the coolant. For example, in some aspects using water, the fuel cell system may be stored or operated at sub-zero Celsius temperature conditions, and the water in the fuel cell stack and water storage tank may freeze. The frozen water may cause blockages that hinder the supply of coolant or hydration water to the fuel cell stack. This is a particular problem when the fuel cell system is off and water in the water storage tank is no longer heated by its passage through the stack. The water may then freeze completely. In such an event, sufficient liquid water may not be available for hydration and/or cooling. As a result, the fuel cell assembly may be prevented from restarting or operating at full power until the frozen water has been thawed.

In some exemplary implementations, a heating element may be provided in the fuel cell system to melt frozen coolant. The heater may operate from a battery or another power source and maintain the fuel cell system at above-freezing temperatures to prevent freezing of the coolant/water.

In aspects utilizing battery power to operate the heating element, the battery power may be limited, and the fuel cell system may experience freezing if the battery fails or becomes discharged. As such, it may be advantageous to operate the heating element intermittently when liquid coolant is necessary, rather than at all times or in preset time cycles. Additionally, it may be advantageous to utilize heat generated by operation of the fuel cell system rather than a battery since batteries may experience low performance in cold temperatures.

In some implementations, a fuel cell system may include a coolant module configured to receive and contain coolant, for example water. In some exemplary aspects where the coolant includes water and the fuel cell system is in a sub-zero Celsius temperature environment, the water in the module may freeze. When the fuel cell system is restarted, water from the module may be required for cooling the fuel cell stack and/or hydration of fuel cell membranes that form the fuel cells of the fuel cell stack. Some fuel cell systems lack a heating element to maintain an above-freezing temperature while the system is powered down. If the water in the coolant module is frozen, it must be thawed so that it is available to the fuel cell assembly.

Referring to FIG. 1, a fuel cell system 1 may include a fuel cell assembly 2, a coolant module 3, and a pump 11. The coolant module 3 may include one or more coolant tanks 9. The pump 11 may be configured to move coolant from a coolant tank 9 of the coolant module 3 to the fuel cell assembly 2. The fuel cell assembly 2 may receive a flow of fuel, such as hydrogen, through an anode inlet 4 and a flow of oxidant, such as air, through a cathode inlet 5. An anode exhaust 6 may be disposed on the fuel cell assembly 2 and may be configured to allow the fuel to flow through the fuel cell assembly. A cathode exhaust 7 may be disposed on the fuel cell assembly 2 and may be configured to permit the oxidant to flow through the fuel cell assembly. It will be appreciated that the exhaust flows also carry reaction by-products and any coolant/hydration liquid that may have passed through the fuel cell assembly 2. The cathode exhaust 7 may include a coolant separator 8 to separate the coolant (e.g., water) from the cathode exhaust flow. The separated water may be stored in the coolant storage module 3. It will be appreciated that while this example shows the recycling of water coolant that has passed through the stack, this disclosure is applicable to systems that do not recycle coolant or recycle coolant in a different way.

The coolant storage module 3 may be connected to the fuel cell assembly 2 by conduits. Alternatively, the coolant storage module 3 may be integrated with the fuel cells in the stack. As shown in FIG. 1, the coolant storage module 3 may be connected to the cathode inlet 5 to allow for the introduction of coolant into the cathode flow for evaporative cooling of the fuel cell assembly 2. Alternatively, the coolant may be introduced to the fuel cell assembly by a separate conduit.

Flow of the coolant may be controlled by a coolant injection controller 10. The coolant injection controller 10 may form part of a fuel cell system controller 15 for controlling further operations of the fuel cell system. The coolant injection controller 10 may provide control signals to a pump 11 to control the delivery of water to the fuel cell assembly 2. The pump 11 may fluidly communicate with the coolant module 3 and the cathode inlet 5. The pump may include one or more pumping mechanisms typically used in flow fields, such as, but not limited to, peristaltic pumping, positive displacement pump, displacement pumping, and centrifugal pumping.

The controller 10 may also control one or more heater elements disposed on or within the coolant module 3. Referring to the illustrative implementation of FIG. 1, heater elements 12, 13, located in the coolant storage module 3, are electrically coupled with the coolant injection controller 10.

In some aspects, the heater elements 12, 13 may include a first heater element 12 and a second heater element 13 spaced from the first. The coolant storage module 3 may include a plurality of coolant storage tanks 9 configured to supply coolant to the fuel cell assembly. Each of the coolant storage tanks may have one or more heater elements. The one or more heater elements may be electrically powered or combustion-energy powered and may include a heat dissipating element, which may include a resistive heater or heat pipe or heat exchanger that moves heat from one part of the fuel cell system to another. In some implementations, for example, the compressors that drive oxidant through the fuel cell assembly heat up relatively quickly after start-up of the fuel cell assembly, and a heat exchange and working fluid and/or heat pipe may move heat from the compressors to the coolant storage module. In some aspects, exhaust that exits the fuel cell assembly at the cathode exhaust 7 is sufficiently warm. This exhaust may be used to provide heat to the coolant storage module and to heat the coolant therein, for example by convective means. In other instances heat may be applied via any combination of thermal communication utilizing induction, convection, conduction and radiation. Coolant may be heated by one or more other suitable heating methods, for example by microwave heating. Heating may be via applying heat from one or more heating elements in thermal communication with the tank, the coolant or both. In some aspects, the fuel cell system 1 may include one or more sensors 14. The sensors 14 may communicate with the coolant injection controller 10 and may provide one or more measures of the performance of the fuel cell assembly 2.

In some exemplary implementations, the fuel cell system may be configured to detect the presence and/or the quantity of liquid coolant available in the coolant module. The fuel cell system may be stored or operated in a sub-freezing environment, and some or all of the coolant in the coolant module may be frozen. As detailed throughout this specification, one or more heater elements may be used to melt part or all of the frozen coolant, such that liquid coolant is available for use in cooling and/or hydrating the fuel cell assembly.

Figure 2:
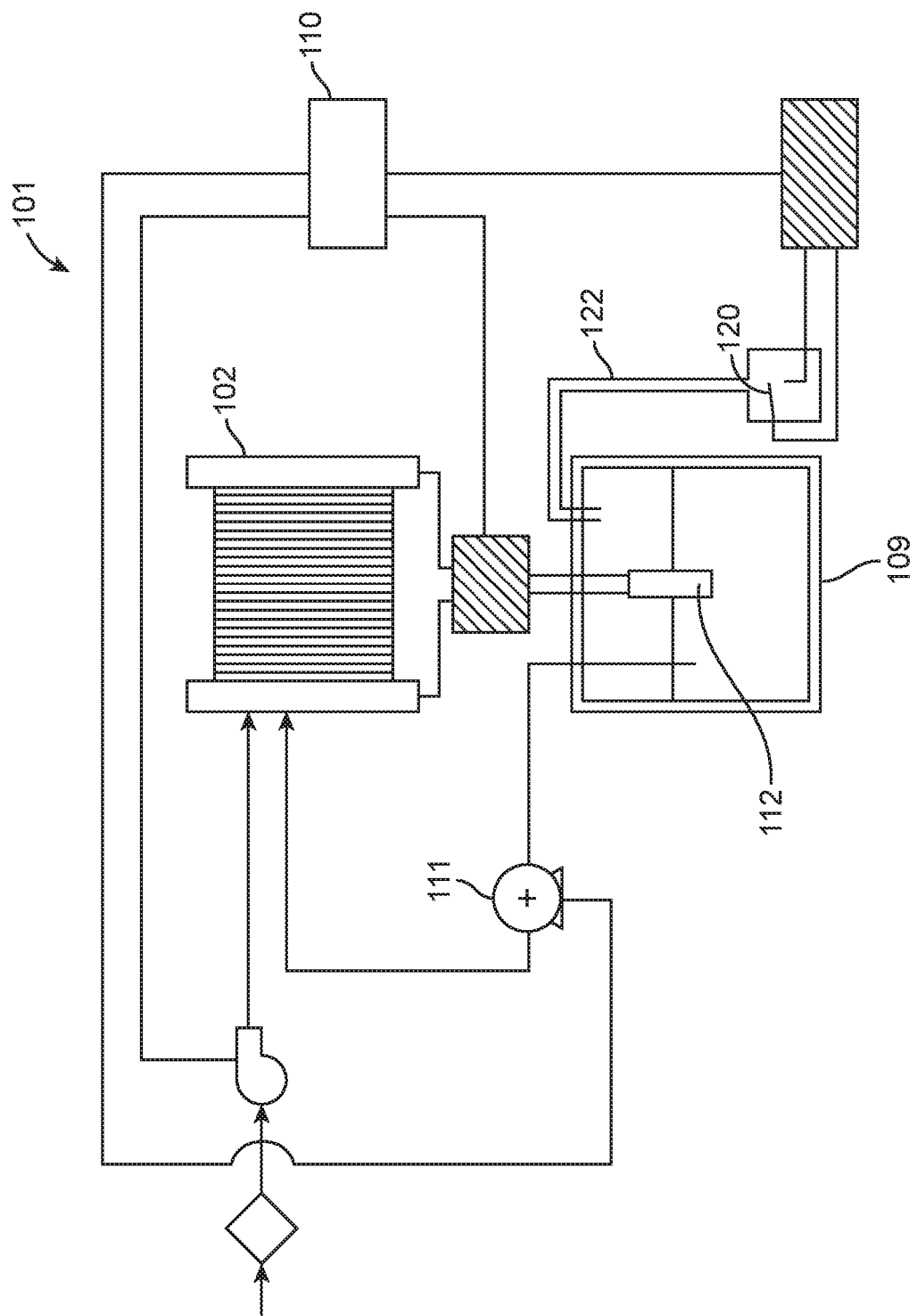
FIG. 2 illustrates a schematic diagram of a fuel cell system according to another aspect of the disclosure.

Referring to FIG. 2, fuel cell system 101 may include a fuel cell assembly 102, which may be a fuel cell stack 102, a coolant module 103, a coolant storage tank 109 within the coolant module 103, a pump 111 fluidly communicating with the coolant module 103 and the fuel cell assembly 102, and one or more sensing instruments. In some aspects, the fuel cell system 101 may further include one or more heater elements 112 disposed on or within the coolant module 103 and configured to heat the coolant. The heater element 112 may be actuated to melt some or all of the coolant in the coolant module when liquid coolant is needed for operation of the fuel cell system.

The sensing instrument may be configured to detect and/or quantify the presence of melted (liquid) coolant, for example liquid water. The sensing instrument may detect presence of liquid coolant in the coolant module 103 and may transmit a command signal to a controller 110. The controller 110 may actuate the pump 111 to move melted coolant from the coolant module 103 to the fuel cell assembly 102. In some implementations, the controller 110 may transmit a command signal to the one or more heater elements 112 to either actuate the heater elements to heat the coolant or to terminate heating of the heater elements.

With continued reference to FIG. 2, when water in the coolant module 103 is frozen, a heater element 112 may be actuated to melt some or all of the water. In some aspects, the sensing instrument may include an electromechanical switch 120, which may include, or be operatively coupled to, a thermometer configured to detect a temperature change of the coolant in the coolant module 103. As the frozen water melts, a portion of the liquid water may evaporate to form water vapor. Thus, in some aspects, the thermometer may detect and quantify an increase in temperature of the vapor generated by heating the coolant. In some exemplary implementations, the thermometer is a bimetallic thermometer that may be configured to actuate the electromechanical switch 120 when the temperature of either the coolant inside the coolant module or the vapor formed from evaporated coolant is greater than a predetermined temperature threshold as indicated by the bimetallic thermometer. It will be understood that various bimetallic thermometers may be used depending on the desired temperature setting and the predetermined threshold. The bimetallic thermometer may comprise, for example, two materials having different temperature-related expansion and contraction properties, such that when the first material expands or contracts, it transitions to a different size or shape. The second material is fixedly attached to the first material, such that the physical change of the first material results in a physical change of the second material. In some aspects, the electromechanical switch may comprise an electrical circuit with a bridge configured to open or close the circuit when a temperature threshold is reached, this type of simple switch, in some implementations, may be used without a microprocessor control.

Still referring to FIG. 2, the water vapor moves through a pressure transmission tube 122 and contacts the electromechanical switch 120. A predetermined threshold temperature of water vapor may correspond to a desired amount of melted water in the coolant module 103. Once the predetermined threshold temperature is surpassed, the electromechanical switch 120 is activated transmitting a command signal to the controller 110. The controller 110 may actuate the pump 111 to move some or all of the melted liquid water from the coolant module 103. In some implementations, the controller 110 may actuate the heater element 112 to cease heating the coolant. This may be advantageous because by only melting the amount of coolant necessary to start up the fuel cell system, energy and time may be saved.

In some aspects, the sensing instrument may be configured to detect a change in pressure. Pressure may be calculated within the coolant module 103, inside a particular coolant storage tank 109, and/or at the location of the sensing instrument. In some aspects, the sensing instrument may include one or more pressure sensors 126. The pressure sensor 126 may be configured to detect and quantify vapor pressure in the fuel cell system. As more coolant is melted by the heater element 112, more liquid coolant is evaporated into vapor. When the vapor pressure is greater than a predetermined pressure threshold as indicated by the pressure sensor 126, the pressure sensor may transmit a command signal to the controller 110. As with temperature sensing, it will be understood that the predetermined threshold pressure may vary depending on the desired amount of melted coolant. In some aspects, the fuel cell system may include multiple pressure sensors 126. The pressure sensors 126 may be disposed in different components of the system, for example inside a coolant storage tank 109 or the pressure transmission tube 122.

In another exemplary implementation, the sensing instrument may comprise one or more strain gauges 124 disposed on or within the coolant module 103. The strain gauge 124 may be configured to measure the expansion or contraction of a portion of the coolant module 103. As coolant, such as water, freezes, the volume of coolant expands; conversely, when frozen coolant melts, the total volume of coolant contracts. Tanks may be formed of metallic materials, non-metallic materials or contain one or more nonmetallic and one or more metallic portions. The non-metallic materials or portions may be configured to be more flexible then the metallic materials thereby accommodating some volume change due to expansion and contraction. The coolant storage tank 109 may be configured to expand and contract as the coolant freezes and melts, respectively. In some implementations, the entire coolant module 103 may expand and contract. The strain gauge 124 may detect and measure the amount of expansion and contraction due to the respective freezing and melting of the coolant. In some aspects, the strain gauge 124 may measure the amount of contraction that corresponds to some or all of the frozen coolant melting. Once the strain gauge 124 detects a change beyond a predetermined strain threshold, the strain gauge may transmit a signal to the controller 110. As with other implementations disclosed herein, it will be understood that the predetermined strain threshold may vary and may be determined based on the desired quantity of liquid coolant in the coolant module 103.

In some aspects, multiple strain gauges 124 may be utilized. The multiple strain gauges 124 may be disposed on different portions of the coolant module. For example, a first strain gauge may be placed apposite a second strain gauge. In some aspects, strain gauges 124 may be disposed either inside the coolant module 103 or the outside surface of the coolant module. A strain gauge may be positioned on the coolant storage tank 109 or on another component of the coolant module 103. In some implementations, a strain gauge 124 may be disposed on the frozen coolant substantially distanced from the heater element 112, such that the strain gauge may more accurately measure the change in frozen coolant and not be significantly influenced by the close proximity of a heater element. In some aspects, a strain gauge 124 may be disposed adjacent the fluid connection to the pump 111. Placing a strain gauge adjacent the pump may be advantageous because it increases the accuracy of quantifying how much melted coolant is available at the pump interface for pumping.

In some implementations, a strain gauge 124 may be submersed into or contacted with the coolant when the coolant is in a frozen state. The strain gauge 124 may detect melting of the coolant. In such aspects, it may be further advantageous to include a plurality of strain gauges 124 on various portions of the coolant. Each strain gauge may transmit a command signal to the controller 110, which may calculate an accurate quantity of melted coolant based on one or more signals received from the one or more strain gauges. In some aspects, the strain gauge may function as an electromechanical switch. The strain gauge may form part of an electrical circuit, such that when a strain threshold is reached, the strain gauge opens or closes the electrical circuit.

Various types of strain gauges may be used. For example, in some implementations, the strain gauge may be configured to measure compression. Alternatively, the strain gauge may be configured to measure tension. Further alternatively, the strain gauge may be configured to measure shear strain. In some aspects, more than one type of strain gauge may be used in a fuel cell system.

Figure 3:
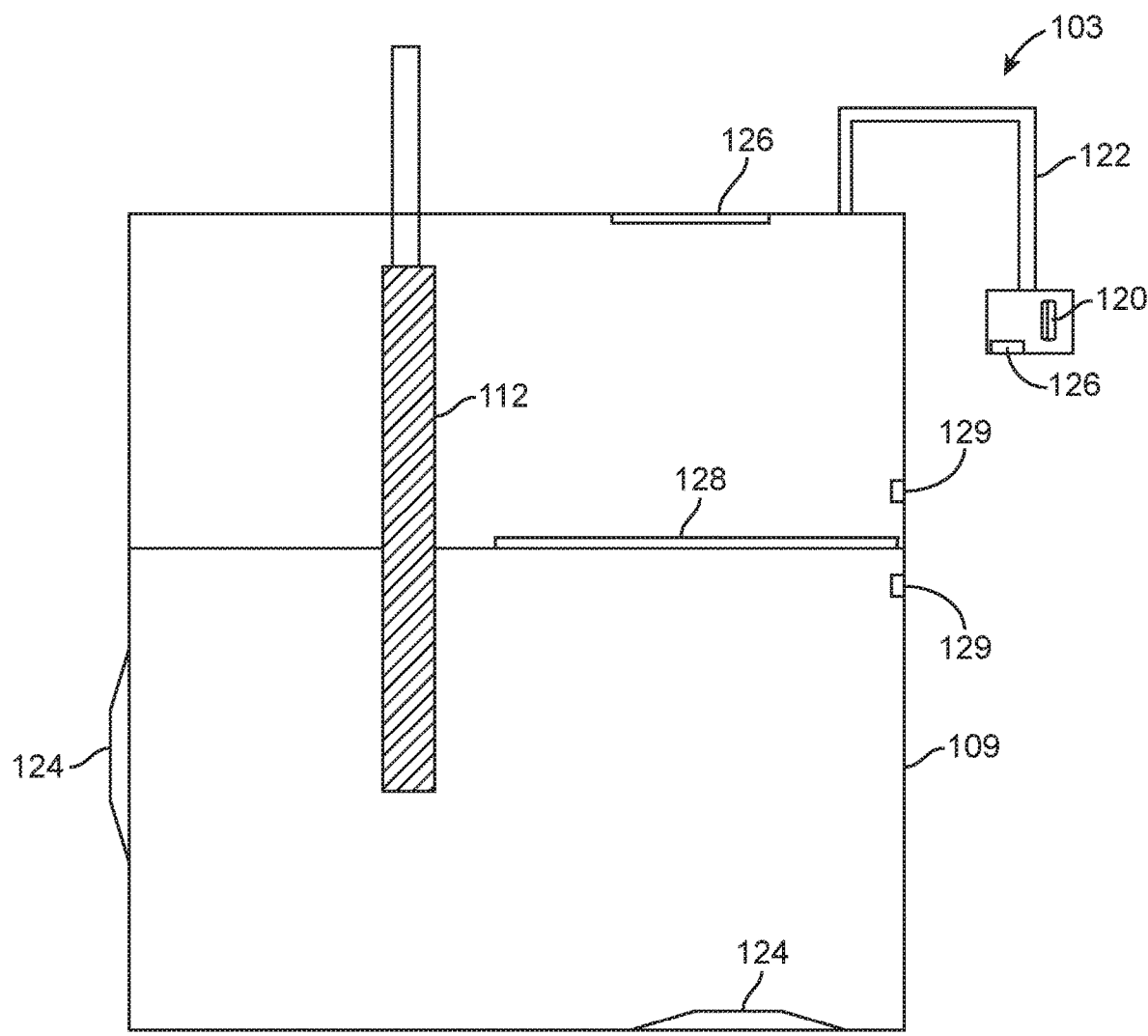
FIG. 3 illustrates a schematic diagram of a coolant module according to an aspect of the disclosure.

In yet another implementation, the sensing instrument may comprise a float 128 disposed within the coolant module 103. The float 128 comprises material that is less dense than coolant used in the fuel cell system when the coolant is either in a solid or a liquid state, and so the float 128 is always configured to be on the surface of the volume of frozen or melted coolant. When coolant freezes, the total volume of coolant may expand; conversely, when coolant melts, the total volume may contract. The float 128 is configured to move in a first direction as coolant expands and in a second direction opposite the first direction when coolant contracts. Referring to FIG. 3, the float 128 may be disposed inside the coolant module 103, such that when the coolant (e.g., water) freezes, the float 128 moves vertically up in the coolant module, and when coolant melts, the float 128 moves vertically down.

The float 128 may be mechanically or electrically coupled to the controller 110, and it may transmit a signal to the coolant injection controller that corresponds to the distance and direction of movement of the float 128. In some implementations, the coolant module 103 may include one or more switches 129 that are toggled as the float 128 moves in either the first direction or the second direction. The switches may be mechanical switches, such as buttons, or digital switches, such as optical sensors.

The controller 110 may be configured with a program to convert the signals received from the strain gauge, the pressure sensor, the bimetallic thermometer, the float, or another measurement instrument, and the coolant injection controller may receive multiple signals from one or more measurement instruments 120. The program may include predetermined thresholds for each measurement instrument described herein, and the program may be modifiable by a user. The program may further transmit command signals to other components of the fuel cell system, such as the heater element, the pump, or another system controller.

In some aspects, the controller 110 may actuate the heater element 112 to heat the coolant, change the rate of heating, or to terminate heating. In some exemplary implementations where the fuel cell system is stored or operated in a sub-freezing environment, it may be advantageous to melt a greater quantity of coolant than is minimally necessary to effectively operate the fuel cell system. In sub-freezing environments, melted coolant is subject to refreezing as it contacts components of the fuel cell system that at sub-freezing temperatures as well. As such, it may be advantageous to account for the amount of liquid coolant that is expected to refreeze. This drawback may be overcome by melting a greater volume of coolant. To avoid a shortage of liquid coolant upon refreezing, the melted coolant should equal at least the sum of the volume needed to effectively operate the fuel cell system and the volume of liquid coolant that is expected to refreeze upon contact with sub-freezing temperature components.

In some aspects, the coolant may be heated to a temperature greater than its melting point. By heating beyond the melting point, the melted coolant may engage with various components of the fuel cell system (e.g., the pressure transmission tube 122) while such components are at sub-freezing temperatures. Coolant that is heated to exactly the melting point (or insubstantially higher than the melting point) may refreeze upon contacting any lower-temperature components. This may obstruct a fuel cell system that has detected a quantity of melted coolant but cannot utilize the entire content due to a portion of it refreezing. Thus, by heating the coolant to a suitable temperature greater than the melting point ensures that coolant will remain in liquid form even after contact with cooler components. In some exemplary implementations that utilize water as the coolant, the water may be heated up to at least one of about 1 degree C., up to about 10 degrees C., up to about 20 degrees C., one of about 30 degrees C., up to about 40 degrees C., or to greater temperatures.

Figure 4:
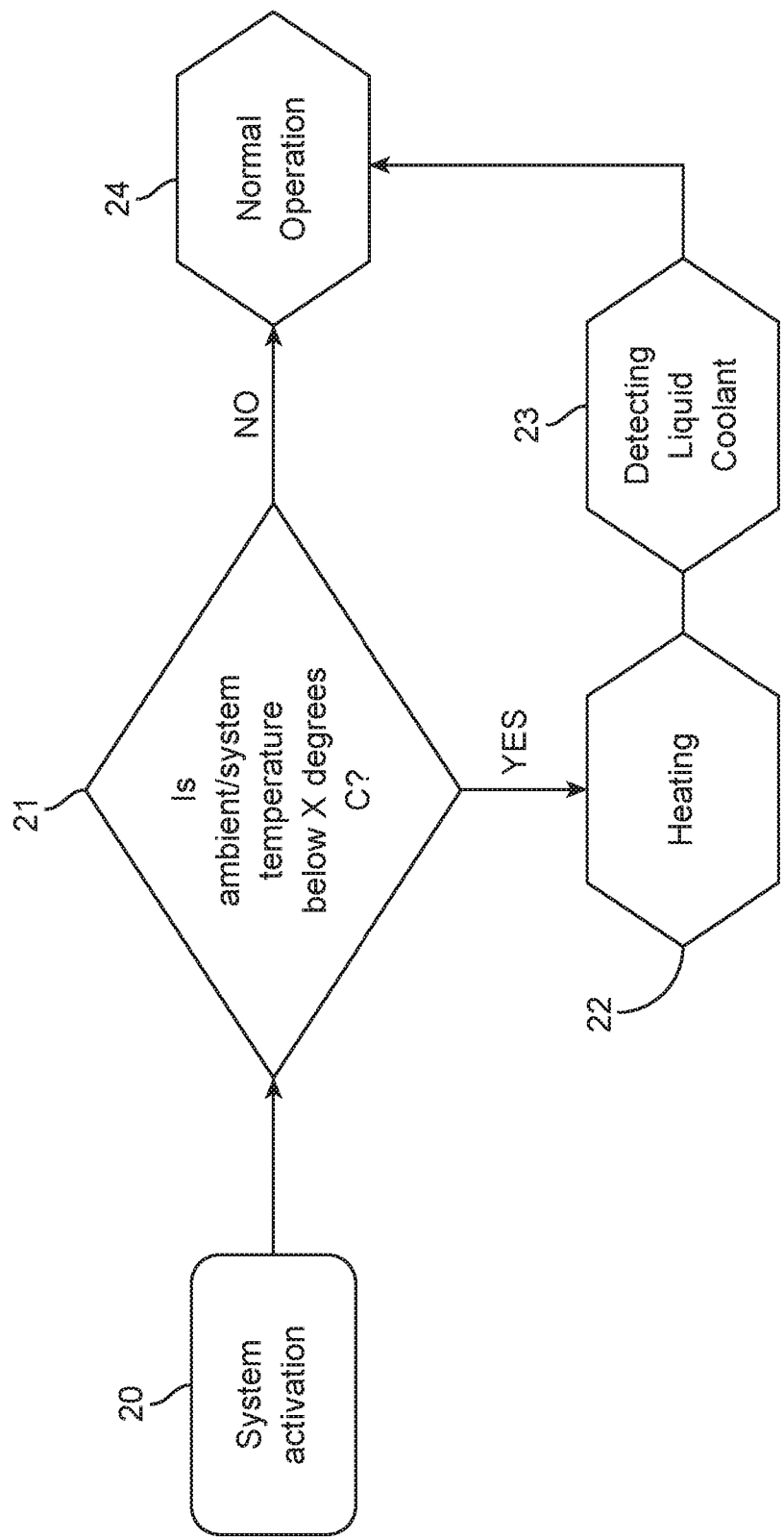
FIG. 4 illustrates a flow chart depicting a method of operation of a fuel cell system according to an aspect of the disclosure.

Turning to FIG. 4, an exemplary method of detecting flowable coolant for operation of the fuel cell system 101 is shown. The method may be performed by the fuel cell system controller 110. The method of operation is performed to enable the fuel cell system to effectively start when used in cold or freezing ambient conditions. In cold or freezing ambient conditions, there is a risk that coolant required by the fuel cell assembly 102 may not be available because it is frozen in the coolant storage module 103. It is important for the fuel cell system to identify when there may be an insufficient amount of coolant available and to modify its operation accordingly to enable reliable start-up of the fuel cell system. This is particularly important when the fuel cell system 101 provides the motive power for a vehicle. A user of the vehicle will expect the fuel cell system to reliably start and be able to provide effective power for the vehicle in a wide range of operating environments. This is a challenge given that resources, such as coolant, that are required by the fuel cell assembly for efficient operation may not be, at least initially, available for use.

As shown in FIG. 4, the fuel cell system 101 is turned on in step 20 to operate the fuel cell assembly 102. This may include powering up of electrical systems, such as the controller 110 and other components. This may initiate a supply of fuel and oxidant to the fuel cell assembly 102.

Step 21 shows the determination of the temperature of the fuel cell system 101. One or more temperature sensors disposed on one or more components of the fuel cell system may measure the temperature of the ambient environment and/or individual components of the fuel cell system. In some implementations, a temperature sensor is disposed on or within the coolant module 103 to measure the temperature of the coolant therein. The determined temperature, or a minimum or maximum or average of a plurality of temperature measurements from multiple temperature sensors, are compared to a predetermined temperature threshold to determine the risk of coolant being frozen. In some exemplary implementations, the predetermined temperature threshold is about 10 degrees C. It will be appreciated that the predetermined temperature may be 0, 1, 2, 3, 4, 5, 6, 7, 8, 9 degrees C., or some other value related to the freezing point of the coolant or other freezable resources the fuel cell system requires. If the determined temperature is lower than the predetermined temperature threshold, the method proceeds step 22, in which the fuel cell system 101 ensures there is sufficient liquid coolant to operate the system effectively. If the measured temperature is greater than or equal to the predetermined temperature, the fuel cell system is operated in a "normal operation mode" represented by step 24. In the normal operation mode, the fuel cell system may stop heating the coolant via one or more heating elements, such as a resistive heater or heated exhaust from the fuel cell assembly.

In step 22, the fuel cell system 101 activates a heating element within or adjacent to the coolant as described throughout this disclosure. The heating element heats the coolant until some or all of the coolant melts. In step 23, one or more sensing instruments as described herein detects and/or quantifies the presence of liquid coolant available for immediate use in the fuel cell system 101. Once the necessary amount of liquid coolant is detected, the pump 111 can begin to move liquid coolant from the coolant module 103 to the fuel cell assembly 102, and the fuel cell system 101 may proceed with normal operation as indicated by step 24.

Although labeled with different reference numerals, it will be understood that descriptions of individual components and elements as they apply to a particular implementation may apply to all implementations unless explicitly stated otherwise.

While the disclosure has been described in connection with the various aspects of the various figures, it will be appreciated by those skilled in the art that changes could be made to the aspects described above without departing from the broad inventive concept thereof. It is understood, therefore, that this disclosure is not limited to the particular aspects disclosed, and it is intended to cover modifications within the spirit and scope of the present disclosure as defined by the claims.

Features of the disclosure that are described above in the context of separate implementations may be provided in combination in a single implementation. Conversely, various features of the disclosure that are described in the context of a single implementation may also be provided separately or in any sub-combination. Finally, while an implementation may be described as part of a series of steps or part of a more general structure, each said step may also be considered an independent implementation in itself, combinable with others.

The invention claimed is:

1. A cooling module for use in a fuel cell system, the cooling module comprising:
   a tank configured to receive a coolant therein;
   coolant;
   a pump in fluid communication with the coolant in the tank and the fuel cell system, the pump being configured to transport the coolant to the fuel cell system;
   a heating element comprising vapor generated within the tank, the vapor configured to heat the coolant;
   at least one sensor in signal communication with the pump and in fluid communication with the tank, the sensor configured to detect a change corresponding to the presence or absence of sufficient liquid coolant to initiate said pump.

2. The cooling module for use in a fuel cell system of claim 1, wherein the coolant is at least one of frozen and partially frozen.

3. The cooling module for use in a fuel cell system of claim 2, wherein the sensor is a thermocouple.

4. The cooling module for use in a fuel cell system of claim 3, wherein the controller is configured to heat the coolant until a predetermined set point is reached of the vapor temperature as indicated by the thermocouple.

5. The cooling module for use in a fuel cell system of claim 2, wherein the sensor includes a float configured to move in a first direction and a second direction opposite the first direction in response to change in the quantity of the frozen or partially frozen coolant.

6. The cooling module for use in a fuel cell system of claim 1, wherein the sensor is located remote from the liquid or frozen coolant and positioned to measure a quality of the vapor phase of the coolant.

7. The cooling module for use in a fuel cell system of claim 6, wherein the sensor measures change of at least one of vapor pressure and vapor temperature.

8. The cooling module of claim 1, further comprising a controller in signal communication with the sensor and the pump, the controller configured to actuate the pump in response to the signal of the sensor.

9. The cooling module for use in a fuel cell system of claim 8, wherein the controller is configured to heat the coolant until a predetermined set point is reached of at least one of the vapor pressure and the vapor temperature as indicated by the sensor.

10. The cooling module for use in a fuel cell system of claim 8, further comprising at least one submersible strain gauge disposed in the coolant.

11. The cooling module for use in a fuel cell system of claim 1, wherein the sensor is one or more submersible strain gauges placed in the coolant.

12. The cooling module for use in a fuel cell system of claim 1, wherein the coolant is water.

13. The cooling module for use in a fuel cell system of claim 1, wherein the pump is at least one of a peristaltic pump, a positive displacement pump and a centrifugal pump.

14. The cooling module for use in a fuel cell system of claim 1, wherein the sensor is an electromechanical switch.

15. The cooling module for use in a fuel cell system of claim 14, wherein the electro-mechanical switch is a bimetallic switch.

16. The cooling module for use in a fuel cell system of claim 1, wherein the heating element includes an electrical resistance heater.

17. The cooling module for use in a fuel cell system of claim 1, wherein the heating element further includes exhaust from the fuel cell system, the exhaust being of sufficient temperature to melt at least a portion of the coolant when the coolant is in its frozen state.

18. A cooling module for use in a fuel cell system, the cooling module comprising:
- a tank configured to receive a coolant therein;
- water coolant;
- a pump in fluid communication with the water coolant in the tank and the fuel cell system, the pump being configured to transport the coolant to the fuel cell system;
- a heating element in thermal communication with at least one of the water coolant and the tank, the heating element comprising vapor generated within the tank, the vapor configured to heat the water coolant;
- at least one sensor in signal communication with a controller and in physical contact with a portion of the tank configured to detect a change in the stress the water coolant exerts on the tank or any portion thereof;
- wherein the phase of the water coolant corresponds to the presence or absence of sufficient liquid coolant to initiate said pump; and,
- wherein the controller processes sensor data and is configured to actuate the pump.

19. The cooling module for use in a fuel cell system of claim 18 wherein the water coolant is at least one of frozen and partially frozen.

20. The cooling module for use in a fuel cell system of claim 19, wherein the sensor is located on an external portion of the tank not immersed in the water coolant.

21. A method of detecting flowable coolant for use in a fuel cell system, the method comprising the steps of:
- introducing a coolant into a tank;
- heating the coolant by generating vapor in the tank;
- measuring a change associated with the coolant via a sensor in fluid communication with the tank;
- processing the measurement with a controller in signal communication with the sensor;
- determining from the measurement if sufficient liquid coolant is available for transport to the fuel cell; and
- actuating a pump in signal communication with the controller to move the liquid coolant to the fuel cell system via the pump, the pump being in fluid communication with the tank and the fuel cell system.

22. The method of detecting flowable coolant for use in a fuel cell system of claim 21, wherein the coolant is water.

23. A method of detecting flowable coolant for use in a fuel cell system of claim 22 wherein the sensor is one or more submersible strain gauges placed in the coolant.

24. A method of detecting flowable coolant for use in a fuel cell system of claim 21, wherein the sensor measures at least one of a vapor pressure and a vapor temperature.

25. A method of detecting flowable coolant for use in a fuel cell system of claim 21, wherein the sensor is a thermocouple, a bimetallic switch, a pressure sensor, a strain gauge, or a float configured to move in a first direction and a second direction opposite the first direction in response to change in the quantity of the frozen or partially frozen coolant.

* * * * *